Sept. 29, 1964  R. C. ROOT  3,150,635
ADJUSTMENT INDICATOR FOR PANEL-MOUNTED
TRIMMER POTENTIOMETERS
Filed July 11, 1963

INVENTOR
RAYMOND C. ROOT
BY
Dick, Zarley & Hudson
ATTORNEYS

United States Patent Office 3,150,635
Patented Sept. 29, 1964

3,150,635
ADJUSTMENT INDICATOR FOR PANEL-MOUNTED TRIMMER POTENTIOMETERS
Raymond C. Root, Columbus, Nebr., assignor to Dale Electronics, Inc., Columbus, Nebr.
Filed July 11, 1963, Ser. No. 294,322
10 Claims. (Cl. 116—124)

Trimmer potentiometers are customarily equipped with an elongated leadscrew which is adapted, upon being rotated, to move a wiper assembly along a collector bar and a resistance coil. Movement of the wiper assembly by rotation of the leadscrew effects variable resistance in the circuit to which the potentiometer is connected. One end of the leadscrew is characteristically permitted to extend from one end of the potentiometer housing. The leadscrew head on the outside of the housing ordinarily has a slot to receive a screwdriver or similar tool to effect the rotation of the leadscrew. This invention relates to means for visually measuring and determining the amount of rotation imparted to the leadscrew.

Therefore, a principal object of this invention is to provide an adjustment indicator for panel-mounted trimmer potentiometers which will permit visual measurement of the rotational displacement of the potentiometer leadscrew.

A further object of this invention is to provide an adjustment indicator for panel-mounted trimmer potentiometers which will be adapted for use on potentiometers of ordinary construction.

A still further object of this invention is to provide an adjustment indicator for panel-mounted trimmer potentiometers that will permit an accurate measurement of the rotational displacement of the potentiometer leadscrew.

A still further object of this invention is to provide an adjustment indicator for panel-mounted trimmer potentiometers that is comprised of a minimum of parts to minimize the cost of fabrication and to minimize the likelihood of malfunction.

A still further object of this invention is to provide an adjustment indicator for panel-mounted trimmer potentiometers which can be easily and quickly adapted for use with conventional-type potentiometer designs.

A still further object of this invention is to provide an adjustment indicator for panel-mounted trimmer potentiometers that is economical of manufacture, durable in use, and refined in appearance.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawings, in which:

Figure 3:
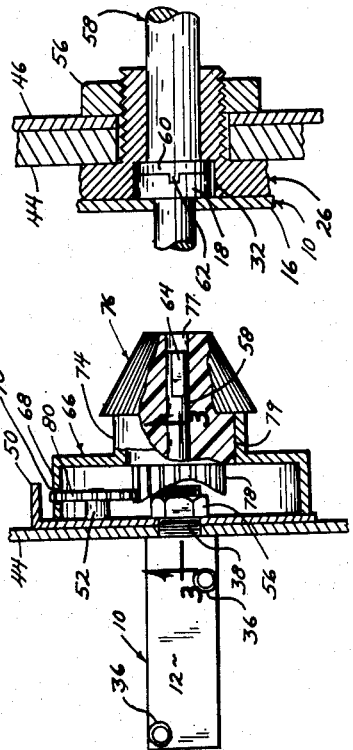
FIGURE 3 is an enlarged sectional view of the device of this invention taken on line 3—3 of FIGURE 2.

The numeral 10 generally designates a trimmer potentiometer which has a housing 11 of rectangular shape. The housing 11 is comprised of sides 12, and ends 14 and 16. A conventional leadscrew is rotatably mounted within the housing and the leadscrew head thereof extends through end 16 of the housing. A slot 20 appears in the leadscrew head 18 and is adapted to receive a screwdriver or the like in the ordinary use of the device. Mounting holes 22 extend through the housing 11 and conventional flexible leads 24 extend from the end 14 thereof.

Figure 2:
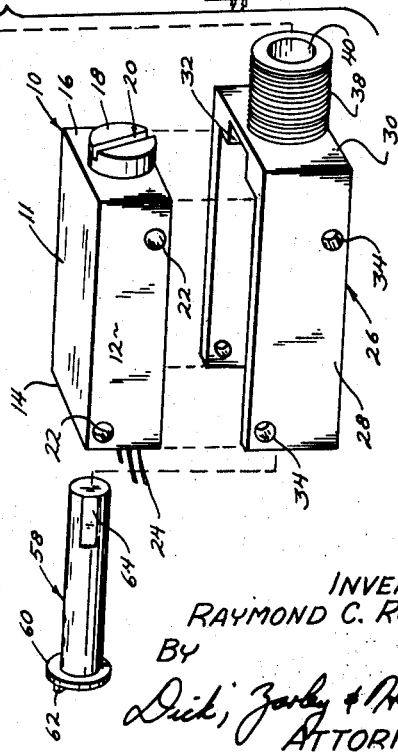
FIGURE 2 is a sectional view on a reduced scale through the assembled parts of the device of this invention.
Figure 1:
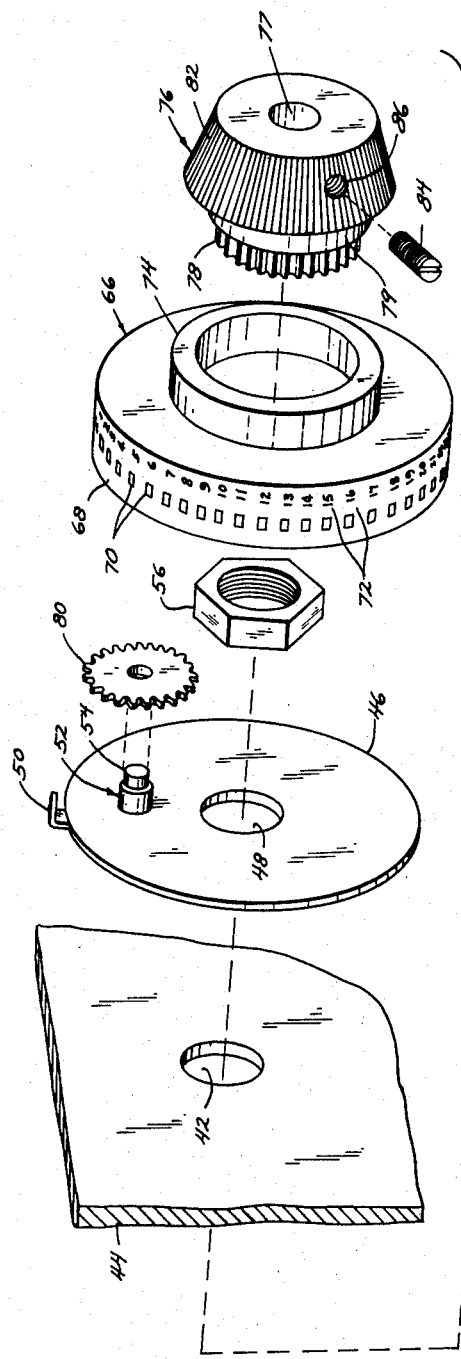
FIGURE 1 is an exploded schematic layout of the various parts of the device of this invention.

A U-shaped mounting bracket 26 is comprised of parallel sides 28 and an end 30. A notch 32 appears on the inner face of the end 30 of the mounting bracket as shown in FIGURES 1 and 3. Mounting holes 34 in the sides 28 of the bracket are adapted to register with the holes 22 in the potentiometer housing and rivets 36 (as shown in FIGURE 2) are adapted to thereupon secure the mounting bracket and the potentiometer housing together.

An externally threaded cylindrical barrel 38 extends outwardly from the end 30 of mounting bracket 26. Barrel 38 has a center opening or bore 40 and the barrel is adapted to extend through the access opening 42 in panel 44.

A circular disc 46 with a center opening 48 is adapted to be mounted on the free end of the barrel 38 after it has been extended through the access opening 42 of the panel 44. An indicator or pointer element 50 is secured to the periphery of the disc 46. A bearing shaft 52 extends perpendicularly from the disc 46 away from the panel 44 and terminates in a reduced diameter 54. A nut 56 is mounted on the free end of barrel 38 to secure the bracket 26, the panel 44, and the disc 46 together as a unit.

An adapter shaft 58 has a small circular plate 60 secured to one end thereof and a tongue element 62 extends outwardly from the plate element. As shown in FIGURE 3, the plate and tongue element of the adapter shaft 58 are adapted to nest in the notch 32 of the mounting bracket 26 when the shaft has been inserted in the center bore of the barrel 38. In addition, the tongue element 62 is adapted to be received in the slot 20 of leadscrew head 18 so that subsequent rotation of the shaft 58 will impart rotational movement to the leadscrew head. A flattened portion 64 appears on the free end of the shaft 58 for a purpose to be discussed hereafter.

A cylindrical cap 66 has a cylindrical flange 68 extending perpendicularly from the periphery thereof. A plurality of notch openings 70 extend in spaced relation around the cylindrical flange 68 as shown in FIGURE 1. Numbers 72 or other appropriate indicia marks are located on the cylindrical flange 68 and there is preferably an indicia mark for each of the notch openings 70. A hollow cylindrical hub 74 extends away from cap 66 in a direction opposite to the flange 68. A knob 76 having a center bore 77 has gear teeth 78 radiating from one of its ends. A cylindrical bearing surface 79 on knob 76 is adapted to be rotatably mounted within the hollow hub 74 of cylindrical cap 66. The engagement of the bearing surface 79 with the hub 74 permits the gear teeth on the knob to extend through the cap as shown in FIGURE 2. An idler gear 80 is rotatably mounted on the recessed diameter 54 of bearing shaft 52 and this gear 80 is adapted to be in meshed condition with the gear teeth 78 on knob 76. The outer end of the knob 76 terminates in a gripping surface 82. A screw 84 is adapted to extend through the threaded aperture 86 in the knob to engage the flat portion 64 of adapter shaft 58 to effect the rigid connection between the knob and the shaft.

The normal operation of this device is as follows: The entire components are assembled in conjunction with a conventional potentiometer in the manner described. It is preferred that when the structure is assembled the zero reading on the cylindrical cap 66 be adjacent the pointer element 50. When the knob 76 is rotated to effect a change in the resistance provided by the potentiometer 10 through rotation of the leadscrew head 18, the gear teeth 78 on the knob impart rotational motion to the idler gear 80 which in turn imparts rotational motion to the cylindrical cap 66. By taking readings from the indicia marks 72 on the cylindrical cap before and after rotational motion has been imparted to the knob 76, the relative rotational displacement of adapter shaft 58 is measured by the difference in these readings.

It is therefore seen that this device will accomplish at least all of its stated objectives.

Some changes may be made in the construction and arrangement of my adjustment indicator for panel-mounted trimmer potentiometers without departing from the real spirit and purpose of my invention, and it is my intention to cover by the my claims, any modified forms of structure or use of mechanical equivalents which may be reasonably included within their scope.

I claim:
1. In combination,
a panel member having an access opening,
an elongated housing substantially rectangular in shape,
a slotted leadscrew head rotatably mounted one end of said housing a U-shaped bracket embracing two sides of said housing and extending across the end of said housing from which said leadscrew head extends.
an opening in said bracket communicating with said leadscrew head and registering with the access opening in said panel,
means securing said bracket to said panel member,
an adapter shaft operatively secured to said leadscrew head and extending through the opening in said bracket and said panel member to the opposite side of said panel member,
and an indicator means operatively secured to said shaft and adapted to rotate when said shaft is rotated, whereby the rotational displacement of said shaft can be measured.

2. In combination,
a panel member having an access opening,
an elongated housing substantially rectangular in shape,
a slotted leadscrew head rotatably mounted on one end of said housing,
a U-shaped bracket embracing two sides of said housing and extending across the end of said housing from which said leadscrew head extends,
a hollow tubular barrel on said bracket extending into the access opening in said panel and communicating with said leadscrew head,
means securing said bracket to said panel member,
an adapter shaft operatively secured to said leadscrew head and extending through said barrel to the opposite side of said panel member,
and an indicator means operatively secured to said shaft and adapted to rotate when said shaft is rotated, whereby the rotational displacement of said shaft can be measured.

3. The structure of claim 2 wherein the means securing said bracket to said panel member is a nut which threadably engages the outer surface of said barrel.

4. The structure of claim 2 wherein means is provided in said barrel to hold said shaft against longitudinal displacement.

5. The structure of claim 2 wherein said indicator means includes a knob element mounted on the outer free end of said shaft, teeth elements on said knob in engagement with an idler gear rotatably mounted on said panel, a cap element rotatably mounted on said knob, means operatively securing said cap element and said idler gear together whereupon rotation of said idler gear will rotate said cap element, and indicia marks on said cap element whereby rotation of said leadscrew head and said shaft by said knob can be visually measured by coordinating said indicia marks on said cap with a fixed point on said panel.

6. In combination,
a panel member having an access opening,
a housing,
a slotted leadscrew head rotatably mounted on said housing,
a bracket secured to said housing,
a hollow tubular barrel on said bracket extending into the access opening in said panel and communicating with said leadscrew head,
a nut threadably embracing said barrel and securing said bracket to said panel,
an adapter shaft operatively secured to said leadscrew head and extending through said barrel to the opposite side of said panel member,
an indicator means on said shaft, including a knob element mounted on the outer free end of said shaft,
teeth elements on said knob in engagement with an idler gear rotatably mounted on said panel,
a cap element rotatably mounted on the outer peripheral portion of said knob and having a teeth-receiving portion on the periphery thereof in mesh with said idler gear, whereupon rotation of said idler gear will rotate said cap element,
and indicia marks on said cap element whereby rotation of said leadscrew head and said shaft by said knob can be visually measured by coordinating said indicia marks on said cap with a fixed point on said panel.

7. In combination,
a panel member having an access opening,
a housing,
a slotted leadscrew head rotatably mounted on said housing,
a bracket secured to said housing,
an opening in said bracket communicating with said leadscrew head and registering with the access opening in said panel,
means securing said bracket to said panel member,
an adapter shaft operatively secured to said leadscrew head and extending through the opening in said bracket and said panel member to the opposite side of said panel member,
a knob element mounted on the outer free end of said shaft,
a cap element rotatably mounted on said knob and having an arcuate flange extending towards said panel,
and gear means interconnecting said knob element and said cap element whereby a given rotational displacement of said knob element will produce a smaller rotational displacement of said cap element,
and indicia marks on said flange whereby rotation of said leadscrew head and said shaft by said knob element can be visually measured by coordinating said indicia marks on said cap with a fixed point on said panel.

8. The structure of claim 7 wherein said gear means includes a gear on the end of said knob element adjacent said panel member, which is in mesh with an idler gear on said panel member, said idler gear being in direct operative engagement with a gear tooth receiving means on said cap element.

9. The structure of claim 7 wherein said gear means includes a gear on the end of said knob element adjacent said panel member, which is in mesh with an idler gear on said panel member, said idler gear being in direct operative engagement with a gear tooth receiving means on said cap element, said gear tooth receiving means comprising a plurality of notch openings in the flange of said cap element.

10. In combination,
a panel member having an access opening,
a housing,
a slotted leadscrew head rotatably mounted on said housing,
a bracket secured to said housing,
an opening in said bracket communicating with said leadscrew head and registering with the access opening in said panel,
means securing said bracket to said panel member,
an adapter shaft operatively secured to said leadscrew head and extending through the opening in said bracket and said panel member to the opposite side of said panel member,
a knob element mounted on the outer free end of said shaft,
a cap element rotatably mounted on said knob,
and gear means interconnecting said knob element and said cap element whereby a given rotational displacement of said knob element will produce a smaller rotational displacement of said cap element,
and indicia marks on said flange whereby rotation of said leadscrew head and said shaft by said knob element can be visually measured by coordinating said indicia marks on said cap with a fixed point on said panel.

References Cited in the file of this patent
UNITED STATES PATENTS

| | | |
|---|---|---|
| 1,549,416 | Halliday | Aug. 11, 1925 |
| 1,920,844 | Curry | Aug. 1, 1933 |
| 2,127,109 | Engelhardt | Aug. 16, 1938 |
| 2,437,785 | Mucher | Mar. 16, 1948 |
| 2,539,575 | George | Jan. 30, 1951 |
| 2,558,326 | Van Dyke | June 26, 1951 |
| 2,744,777 | Mucher | May 8, 1956 |